United States Patent
Lee et al.

(10) Patent No.: US 10,013,786 B2
(45) Date of Patent: Jul. 3, 2018

(54) APPARATUS, METHOD, AND COMPUTER PROGRAM FOR GENERATING CARTOON CONTENT AND APPARATUS FOR DISPLAYING CARTOON CONTENT

(71) Applicant: NAVER CORPORATION, Seongnam-si (KR)

(72) Inventors: Hyun Chul Lee, Seongnam-si (KR); Hyo Kim, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 202 days.

(21) Appl. No.: 14/988,467

(22) Filed: Jan. 5, 2016

(65) Prior Publication Data
US 2016/0260239 A1 Sep. 8, 2016

(30) Foreign Application Priority Data
Mar. 2, 2015 (KR) ........................ 10-2015-0029204

(51) Int. Cl.
*G06T 13/00* (2011.01)
*G06F 3/0484* (2013.01)
*G06F 3/0485* (2013.01)

(52) U.S. Cl.
CPC ............ *G06T 13/00* (2013.01); *G06F 3/0484* (2013.01); *G06F 3/0485* (2013.01)

(58) Field of Classification Search
None
See application file for complete search history.

(56) References Cited

U.S. PATENT DOCUMENTS

2003/0210273 A1  11/2003  Yonemura
2004/0021673 A1*  2/2004  Alessi ............... G06F 3/0481
                                                 345/619

(Continued)

FOREIGN PATENT DOCUMENTS

JP        2002-49925 A     2/2002
KR   10-2011-0123392 A    11/2011

(Continued)

OTHER PUBLICATIONS

Office Action issued in corresponding Japanese patent application No. 2016-017268, dated Dec. 20, 2016.

(Continued)

*Primary Examiner* — James A Thompson
(74) *Attorney, Agent, or Firm* — Greer Burns & Crain, Ltd.

(57) ABSTRACT

An apparatus for generating cartoon content includes a cut input controller configured to control receiving of a signal of adding a first cut comprising one or more layers; an effect input controller configured to control receiving of a type of a first effect applied to the one or more layers; and a cut generator configured to generate a first final cut such that the one or more layers express the first effect by making the first effect correspond to a user event received from a user, wherein the effect input controller controls receiving of directing start and end locations of the first effect in correspondence with the first effect, and wherein the cut generator sets a region between the directing start and end locations of the first effect as a first directing section and generates the first final cut such that the first effect is directed in the first directing section.

14 Claims, 10 Drawing Sheets

(56) References Cited

U.S. PATENT DOCUMENTS

| | | | |
|---|---|---|---|
| 2010/0118036 A1* | 5/2010 | Kim | G06F 17/24 |
| | | | 345/473 |
| 2014/0049547 A1* | 2/2014 | Cabanier | G06T 13/00 |
| | | | 345/473 |

FOREIGN PATENT DOCUMENTS

| | | |
|---|---|---|
| KR | 10-1307790 B1 | 9/2013 |
| WO | 02/47034 | 6/2002 |

OTHER PUBLICATIONS

Office Action issued in corresponding Korean patent application No. 10-2015-0029204, dated Dec. 11, 2015.

* cited by examiner

APPARATUS, METHOD, AND COMPUTER PROGRAM FOR GENERATING CARTOON CONTENT AND APPARATUS FOR DISPLAYING CARTOON CONTENT

CROSS-REFERENCE TO RELATED APPLICATIONS

This application claims the benefit of Korean Patent Application No. 10-2015-0029204, filed on Jan. 16, 2015, in the Korean Intellectual Property Office, the disclosure of which is incorporated herein in its entirety by reference.

BACKGROUND

1. Field

One or more exemplary embodiments relate to an apparatus, method, and computer program for generating cartoon content and a method of displaying the cartoon content, and more particularly, to an apparatus, method, and computer program for generating cartoon content to direct an effect included in a cut (or panel) within a directing section designated by a user, and a method of displaying the cartoon content to direct an effect during a designated directing section in correspondence with an input user event.

2. Description of the Related Art

A cartoon is a picture, or group of pictures, intended to satirize or criticize life or society by exaggerating or omitting the features of an object and using humor, caricature, social commentary, etc. Cartoons may be classified into one or more various types, e.g., romance cartoons, martial arts cartoons, action cartoons, comic cartoons, sports cartoons, science fiction (SF) cartoons, etc., according to the content thereof. A cartoon may show complex human attitudes using a visual system of pictures (images) and characters (text), and is thus more effective to attract the attention of readers than a general book containing only characters.

Recently, with advancements in communication technology, cartoons have been provided not only through comic books, but also via the Internet or the like.

SUMMARY

One or more exemplary embodiments provide an apparatus, method, and computer program for generating cartoon content as intended by a cartoon content creator.

One or more exemplary embodiments provide an apparatus, method, and computer program for generating cartoon content, thereby setting a directing section of an effect included in the cartoon content as a designation section of a creator and directing the effect within the directing section.

One or more exemplary embodiments provide an apparatus for displaying cartoon content, thereby displaying an effect during a directing section designated by a creator in correspondence with a user event.

Additional aspects will be set forth in part in the description which follows and, in part, will be apparent from the description, or may be learned by practice of the presented embodiments.

According to one or more exemplary embodiments, an apparatus for generating cartoon content includes a cut input controller configured to control receiving of a signal of adding a first cut including one or more layers; an effect input controller configured to control receiving of a type of a first effect applied to the one or more layers; and a cut generator configured to generate a first final cut such that the one or more layers express the first effect by making the first effect correspond to a user event received from a user, wherein the effect input controller controls receiving of a directing start location and a directing end location of the first effect in correspondence with the first effect, and wherein the cut generator sets a region between the directing start location and the directing end location of the first effect as a first directing section and generates the first final cut such that the first effect is directed in the first directing section.

The directing end location of the first effect may be determined as one of lower regions in relation to the directing start location of the first effect, and wherein the directing start location and the directing end location of the first effect may be set as lines perpendicular to a scrolling direction of the cartoon content.

The effect input controller may receive a signal of adding a second cut that includes one or more layers and is a subsequent cut of the first cut, control receiving of a second effect applied to the one or more layers included in the second cut, and control receiving of a directing start location and a directing end location of the second effect, wherein the cut generator sets a region between the directing start location and the directing end location of the second effect as a second directing section and generates a second final cut such that the second effect is directed in the second directing section, and wherein the second directing section wholly or partially overlaps with the first directing section.

The first directing section may be broadened or narrowed in consideration of at least one of the number of effects of the first cut, the type of the first effect, and a height of the first cut.

The apparatus may further include: a directing section calculator configured to compare a length of the first directing section and a length of a reference directing section set based on a height of the first cut, and, when the length of the first directing section exceeds the length of the reference directing section, the directing section calculator sets the length of the first directing section as the length of the reference directing section.

According to one or more exemplary embodiments, a method of generating cartoon content includes receiving a signal of adding a first cut included in the cartoon content and including one or more layers, wherein an input unit performs the receiving; receiving a type of a first effect applied to the one or more layers, wherein the input unit performs the receiving; and generating a first final cut such that the one or more layers express the first effect by making the first effect correspond to a user event received from a user, wherein a controller performs the generating, wherein the receiving of the type of the first effect includes: receiving a directing start location and a directing end location of the first effect in correspondence with the first effect, and wherein the generating of the first final cut includes: setting a region between the directing start location and the directing end location of the first effect as a first directing section and generating the first final cut such that the first effect is directed in the first directing section.

According to one or more exemplary embodiments, an apparatus for displaying cartoon content includes a display unit configured to display a display region that is the whole or a part of the cartoon content; a directing section calculator configured to set a directing section of an effect included in a cut within a directing section included in the display region in consideration of a directing start location and a directing end location of the effect; an input unit configured to receive a user event from a user; an event processor configured to calculate a moving distance corresponding to the user event;

and a display controller configured to control the effect to be directed from when the directing start location of the effect passes through a reference directing line of the display region while moving the cartoon content by the calculated moving distance, until the directing end location of the effect passes through the reference directing line.

The directing section calculator may compare the directing section and a reference directing section set based on a height of the cut and resets the directing section.

According to one or more exemplary embodiments, there are provided other methods and systems for accomplishing the inventive concept, and a non-transitory computer-readable recording medium having recorded thereon a computer program for performing the other methods.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
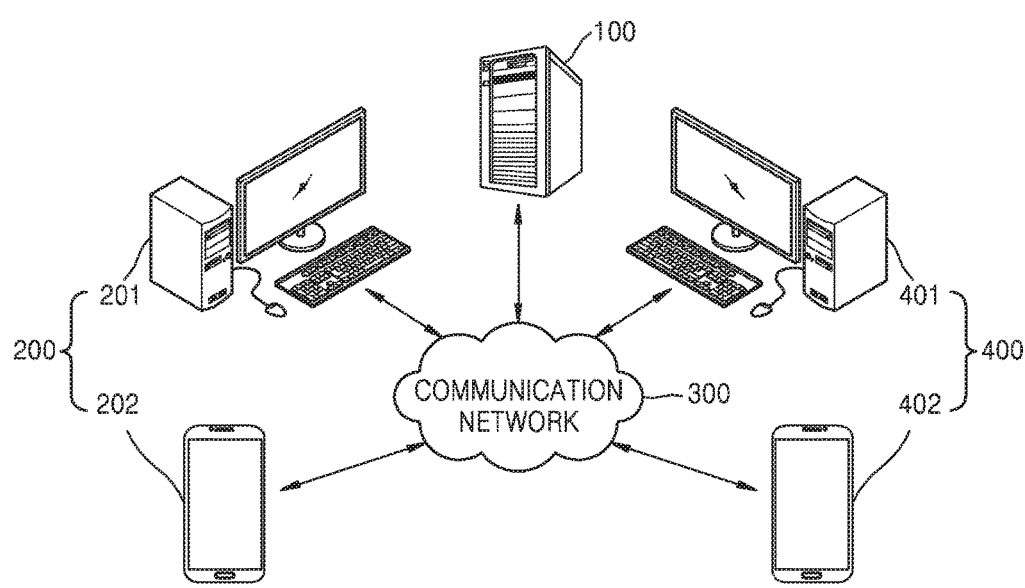
FIG. 1 is a diagram of a cartoon content providing system according to exemplary embodiments.

Reference will now be made in detail to embodiments, examples of which are illustrated in the accompanying drawings, wherein like reference numerals refer to like elements throughout this description. In this regard, the present embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

It should be understood that although the terms 'first', 'second,' etc. may be used herein to describe various components, these components should not be limited by these terms. These terms are only used to distinguish one component from another.

As used herein, the singular forms 'a', 'an' and 'the' are intended to include the plural forms as well, unless the context clearly indicates otherwise.

It will be further understood that the terms 'comprise' and/or 'comprising' used herein specify the presence of stated features or components, but do not preclude the presence or addition of one or more other features or components.

Certain embodiments may be implemented differently, and a specific process order may be performed differently from the described order. For example, two consecutively described processes may be performed substantially at the same time or performed in an order different from, and even opposite of, the described order.

The term 'cartoon content' refers to data created by a cartoon content creator and/or a cartoonist. A portion of the cartoon content may be configured to include at least one cut (panel). The term 'cut' refers to data containing one scene, and may include at least one layer including an image or text. The cartoon content may individually include each cut as an image file, or may consist of one image file that includes the cut, or all of the cuts if the cartoon content include multiple cuts (panels).

The term 'display region' is a region of the cartoon content that is shown to a user through a display unit, or the cartoon content displayed in response to a user request on the region. The cartoon content may correspond to and move according to user events that are input by the user. The display region may be changed according to the movement of the cartoon content, and accordingly the displayed cartoon content may also be changed.

The term 'effect' indicates an animation operation that is contained in or performed upon the whole of the cartoon content (i.e., all cuts (panels)), or a part thereof (one or more of the cuts, or panels, or upon one of more of the layers), and is contained in a layer or a cut. In more detail, examples of different effects include: movement of a layer within a cut, division of a cut or layer, going down (i.e., moving downwardly in the display region such that the cut is moved upwardly in the display region), going up down (i.e., moving upwardly in the display region such that the cut is moved downwardly in the display region), expansion (i.e., increasing the size of the cut or layer), slow movement, fast movement, operations causing a color change, perspective effects on a cut, movements related to a time difference, rotation (of the cut or a layer thereof), transparent processing, rescaling (i.e., changing the size of the cut or a layer thereof), and setting a clipping region (of the cut or a layer thereof), but the term effect is not limited thereto. In this regard, the cut or the layer may include property information. The property information of the cut or the layer may include location information, layer information, a directing start location or a directing end location, a directing section, or other effect information.

In more detail, the location information is information relating to the layer or the cut that is not fixed, but that moves such as the movement or moves during individual time intervals, and that indicates a location that displays the layer or the cut in which the effect is set. The location information may designate an inner or outer location that displays the cut as a pixel value or a percent value. For example, in the case of a first cut including a first layer, the initial and final locations of the first layer may be set as locations in the first cut.

The layer information is information regarding a display sequence of a plurality of layers included in the cut or the layer and may be set as sequentially increasing or decreasing numbers from a layer that is to be displayed uppermost to a layer that is to be displayed lowermost. A plurality of layers included in one cut or layer may be displayed according to the layer information that has been set. A first layer and a second layer displayed behind the first layer may be wholly or partially overlapped. Other effect information may include movement information, speed information, music information, vibration information, color information, an effect display start time, etc. For example, the effect information may include information regarding an initial location, a final location, a start time, or an end time of the layer or the cut or a color change time or point. The effect information may include a first color that is the initial color information and a second color that is the color information as changed from the first color in connection with a color changing effect. The effect information may include a movement speed such as 2 times, 3 times, ½ times, and ⅓ times of speed, and may be triggered by a user event.

FIG. 1 is a diagram of a cartoon content providing system 10 according to exemplary embodiments.

Referring to FIG. 1, the cartoon content providing system 10 according to the exemplary embodiments may include a cartoon content server 100, a cartoon content generation apparatus 200, a communication network 300, and a cartoon content display apparatus 400.

The cartoon content server 100 may provide cartoon content or cartoon content display means to a user terminal. The cartoon content server 100 may provide the cartoon content classified according to authors, episodes, works, and days and may provide works that have been completely published. The cartoon content server 100 may selectively provide the cartoon content according to a request from the user terminal. The cartoon content server 100 may transmit the cartoon content to the cartoon content display apparatus 400 or to the user terminal in an application form over the communication network 300. The cartoon content server 100 may receive and store cartoon content generated by the cartoon content generation apparatus 200.

The cartoon content generation apparatus 200 may provide means for generating the cartoon content to a cartoon content creator (for example, a cartoonist). The cartoon content generation apparatus 400 may provide a user interface for conveniently generating 2D cartoon content. The cartoon content generation apparatus 200 may provide the following functions: a function of generating one or more cuts included in the cartoon content, a function of generating one or more layers included in the cuts, or an effect input function of applying an effect to the layers. The cartoon content generation apparatus 200 may also provide a function of changing and generating a layer including the effect such that the effect may be appropriately provided to a user with respect to the layer.

The cartoon content generation apparatus 200 may provide for setting (applying) an effect to a cut or a layer and designating an effect directing section. The cartoon content generation apparatus 200 may generate a new cut or a new layer in order to direct an effect within the effect directing section.

The cartoon content providing system 10 may include a plurality of cartoon content generation apparatuses 200. The plurality of cartoon content generation apparatuses 200 may include, for example, communication terminals using a web service in a wired/wireless communication environment. In this regard, the cartoon content generation apparatus 200 may be a personal computer (PC) 201 of the user or a mobile terminal 202 of the user. The mobile terminal 202 is illustrated as a smart phone in FIG. 1, but the exemplary embodiments are not limited thereto. As described above, any terminal having an application capable of web browsing embedded therein may be employed without limitation.

In more detail, the cartoon content generation apparatus 200 may include a computer (e.g., a desktop computer, a laptop computer, a tablet PC, etc.), a media computing platform (e.g., a cable box, a satellite set-top box, a digital video recorder, etc.), a handheld computing device (e.g., a PDA, an email client (email reader), etc.), any type of mobile phone, or other types of computing or communication platforms, but the exemplary embodiments are not limited thereto.

The cartoon content display apparatus 400 may be any apparatus that displays the cartoon content received from the cartoon content server 100 or stored cartoon content in correspondence with a user event. In this regard, the cartoon content may be data generated by the cartoon content generation apparatus 200. The cartoon content display apparatus 200 may display the cartoon content from a first cut to a last cut on one page, or on a plurality of pages. The cartoon content display apparatus 400 may move the cartoon content in correspondence with the user event, change a display region displayed on a display of the user terminal, and display the cartoon content. The cartoon content display apparatus 400 may control the effect to be directed in the designated effect directing section.

The cartoon content display apparatus 400 may adjust a moving speed of the cartoon content according to information (types and number of effects, types and number of layers, number of words included in text, etc.) regarding the user event and a cut included in a currently displayed first region, an average reading time or speed of the cartoon content, an average reading time or speed of the user, etc. In alternative exemplary embodiments, the cartoon content display apparatus 400 may adjust the moving distance of the cartoon content according to the information regarding the user event and the cut included in the currently displayed first region.

The cartoon content providing system 10 has a plurality of cartoon content display apparatuses 400. The plurality of cartoon content display apparatuses 400 can be communication terminals using a web service in a wired/wireless communication environment. In this regard, the cartoon content display apparatus 400 may be a PC 401 of the user or a mobile terminal 402 of the user. The mobile terminal 402 is illustrated as a smart phone in FIG. 1 but the exemplary embodiments are not limited thereto. As described above, any terminal having an application capable of web browsing embedded therein may be employed without limitation.

In more detail, the cartoon content display apparatus 400 may include a computer (e.g., a desktop computer, a laptop computer, a tablet PC, etc.), a media computing platform (e.g., a cable box, a satellite set-top box, a digital video recorder, etc.), a handheld computing device (e.g., a PDA, an email client (email reader), etc.), any type of mobile phone, or other types of computing or communication platforms, but the exemplary embodiments are not limited thereto.

Meanwhile, the communication network 300 may connect the plurality of cartoon content display apparatuses 400 and the cartoon content server 100. That is, the communication network 300 may provide connection paths for transmitting and receiving data between the cartoon content display apparatuses 400 and the cartoon content server 100 after the cartoon content display apparatuses 400 access the cartoon content server 100. The communication network 300 may include, for example, wired networks such as local-area networks (LANs), wide-area networks (WANs), metropolitan area networks (MANs), integrated service digital networks (ISDNs), etc. or wireless networks such as wireless LANs, CDMA, Bluetooth, satellite network, etc., but the exemplary embodiments are not limited thereto.

Figure 2:
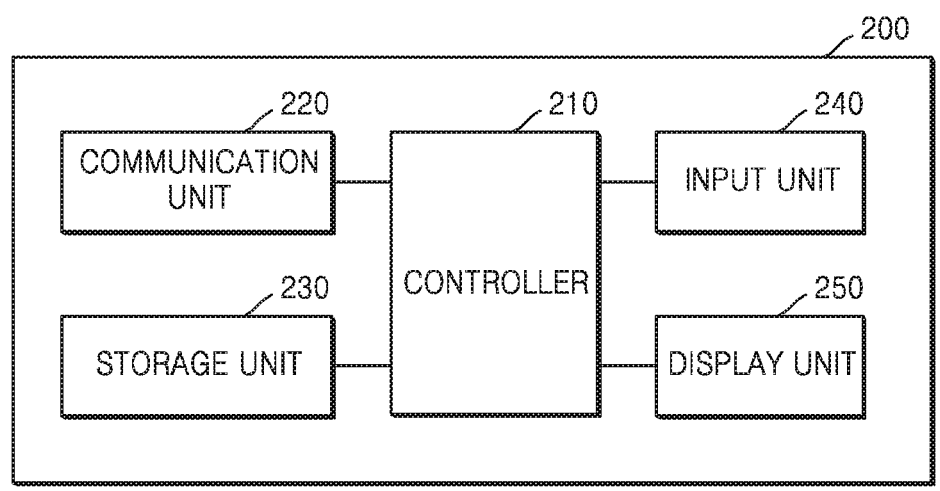
FIG. 2 is a block diagram of a cartoon content generation apparatus according to exemplary embodiments.

FIG. 2 is a block diagram of the cartoon content generation apparatus 200 according to exemplary embodiments.

Referring to FIG. 2, the cartoon content generation apparatus 400 according to the exemplary embodiments may include a controller 210, a communication unit 220, a storage unit 230, an input unit 240, and a display unit 250. It should be noted that throughout this specification, the term unit, as well as the terms controller and processor, and other similar terms, may be considered as components configured as a computer processor (or processors) that operate under the control of at least one program stored in a computer readable memory.

The controller 210 may generate one or more image files (hereinafter referred to as layers) that are input through the input unit 240 as final cartoon content in consideration of an input effect, property information of the effect, etc. The controller 210 may generate the final cartoon content such that a plurality of layers input by a user may be expressed to include the effect set by the user.

The communication unit 220 may include one or more components that enable communication between the cartoon content generation apparatus 200 and the cartoon content server 100. For example, the communication unit 220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, etc. The mobile communication unit may exchange a radio signal with at least one other component chosen from among a base station, an external terminal, and a server in a mobile communication network. The radio signal may include a voice call signal, a video communication call signal, or various types of data via transmission and reception of text/multimedia messages. The communication unit 220 may communicate with the cartoon content server 100 to obtain the cartoon content or an application for displaying the cartoon content from the cartoon content server 100.

The storage unit 230 may store the cartoon content obtained through the communication unit 220.

The input unit 240 may include any means used by a user to input an event or data for controlling the cartoon content generation apparatus 200. For example, the input unit 240 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 240 may obtain a user input. For example, the input unit 240 may obtain a user event with respect to the cartoon content, via a scroll input, a direction key input, a movable touch input having a predetermined direction, or other suitable user input.

The display unit 250 may display a user interface for generating the cartoon content. The display unit 250 may display the user event that is input through the input unit 240 and a cut and a layer added by the user according to the user interface. Meanwhile, when the display unit 250 is configured with a touch screen in which a touch pad forms a layer structure, the display unit 250 may be used as an input device in addition to an output device. The display unit 250 may include at least one of a liquid crystal display (LCD), a thin film transistor-liquid crystal display (TFT-LCD), an organic light-emitting diode (OLED) display, a flexible display, a 3D display, and an electrophoretic display, or any other suitable display.

Figure 3:
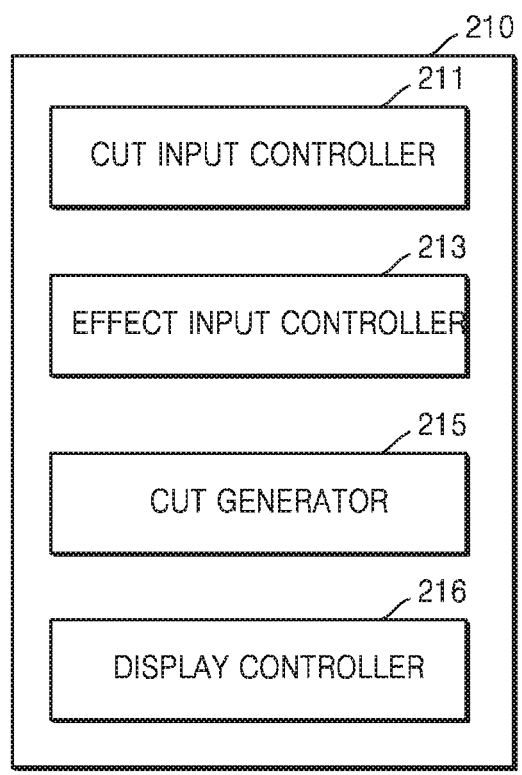
FIG. 3 is a block diagram of the controller of FIG. 2.

FIG. 3 is a block diagram of the controller 210.

Referring to FIG. 3, the controller 210 may include a cut input controller 211, an effect input controller 213, a cut generator 215, and a display controller 216.

The cut input controller 211 may control a cut and property information of the cut, which are to be added by a user, to be input into generated cartoon content. In this regard, the cut may be data included in the cartoon content, and may be configured to express one scene among the cartoon content. The cut may include one or more layers. In this regard, the layer may be 2D data included in the cut, and may include an image or text. Conversely, the cut or the layer may not include anything. In this case, the cartoon content may be generated such that the cut or the layer may be expressed as a blank.

In another exemplary embodiment, the cut input controller 211 may further include a layer input controller (not shown) that controls one or more layers that need to be included in a cut that has been added or selected by the user to be input. The cut input controller 211 may control the layers to be included in the cut in correspondence with a layer addition event that occurs by the user.

The cut input controller 211 may control the input of one or more cuts included in one piece of cartoon content. That is, the cut input controller 211 may receive a first cut included in the cartoon content and a second cut that is a subsequent cut of the first cut.

The effect input controller 213 may control the type of an effect that needs to be included in the one or more layers included in one cut to be input. In this regard, the type of the effect indicates an animation operation included in the layers, and may include movement of the layers, division, going down, going up, expansion, slow movement, fast movement, an operation causing a color change, a perspective effect of a cut, a movement of a time difference, rotation, transparent processing, rescaling, and setting of a clipping region, but is not limited thereto. Other different types of effects may also be included.

The effect input controller 213 may control a directing start location of an effect or a directing end location to be input. In this regard, the directing start location or the directing end location may be information used to determine an effect directing time and may be set as a relative location such as a rate with respect to a height of a cut or an absolute location such as a pixel. For example, the directing start location and/or the directing end location may be set as 10 percent of the height of the screen upward from a cut, 50 percent of the height of the screen downward from the cut, etc. and thus, the directing start location may be input as a specific point, and the directing end location may be input as a distance from the directing start location. For example, the directing end location may be input in the same format, such as 200 percent (or other percentage), which is the relative location with respect to the height of the cut, or 300 pixels (or other number of pixels), which is the absolute location. Basically, the directing start location and/or the directing end location may be set as a cut start location and/or a cut end location in the same manner.

The effect input controller 213 may input the first cut and the second cut such that one or more layers included in the first cut and/or the second cut may individually or wholly include effects and receive directing start locations and/or directing end locations of the effects.

The cut generator 215 may calculate a directing section between a directing start location and/or a directing end location of an effect included in a cut. A directing section of an effect included in the first cut and a directing section of an effect included in the second cut may overlap as intended by a cartoon content creator. In this case, the cut generator 215 may generate a final cut such that directing of the effect included in the second cut starts before a directing end time of the effect included in the first cut. Through the configuration described above, the directing section of the effect included in the cut may be set beyond a single cut region, and may include multiple cut regions.

In another exemplary embodiment, the cut generator 415 may include a directing section adjustor (not shown) that adjusts the length of the directing section. The directing section adjustor may adjust the length of the directing section between the directing start location and the directing end location of the effect. The directing section adjustor may make the following calculations and determinations: calculate a reference directing section length based on a height of the first cut, determine whether the reference directing section length exceeds a preset maximum directing section length, and, if the reference directing section length exceeds the preset maximum directing section length, the directing section adjustor will set the length of the directing section as the reference directing section length, and if the reference directing section length does not exceed the preset maximum directing section length, the directing section adjustor will compare the length of the directing section and the preset maximum directing section length. The directing section adjustor may set the length of the directing section as the preset maximum directing section length when the length of the directing section exceeds the preset maximum directing section length, and maintain the length of the directing section when the length of the directing section does not exceed the preset maximum directing section length. In this regard, the preset maximum directing section length may be set in consideration of the height of the cut and the length of the display region. Through the configuration described above, the directing section of the effect included in the cut may be prevented from increasing in such a way that the directing section may not be recognized by a user, and the directing section of the effect may be increased in such a way that directing of the effect may be appropriately expressed in the directing section of the effect.

The display controller 216 may be configured to provide a user interface for generating cartoon content through the display unit 250. The display controller 216 may be configured to display the user interface for generating the cartoon content and for adding a new cut and a new layer, and to display an effect setup menu that may be included in the layer.

The cartoon content generation apparatus 200 according to the exemplary embodiments may set an effect with respect to one or more layers included in a cut, convert the respective layers that are to be reproduced to include the effect, and generate a final cut including the converted layers.

Figure 4:
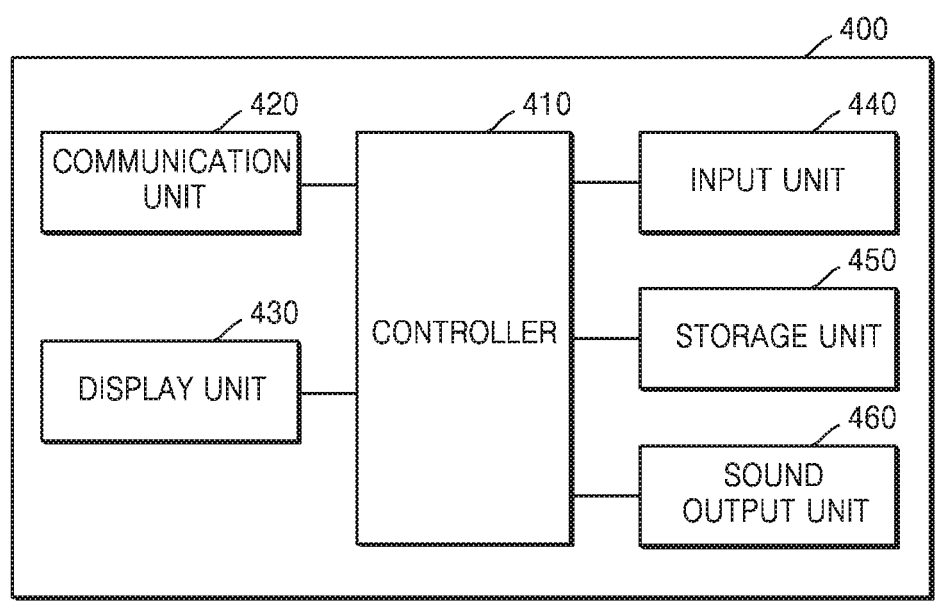
FIG. 4 is a block diagram of a cartoon content display apparatus according to an exemplary embodiment.

FIG. 4 is a block diagram of the cartoon content display apparatus 400 according to exemplary embodiments.

Referring to FIG. 4, the cartoon content display apparatus 400 may include a controller 410, a communication unit 420, a display unit 430, an input unit 440, a storage unit 450, and a sound output unit 460.

The controller 410 may control the display of the cartoon content through the display unit 230. The controller 410 may provide control to appropriately display the cartoon content generated by the cartoon content generation apparatus 200.

That is, the controller 410 may provide control to display the cartoon content generated by the cartoon content generation apparatus 200 as set by a cartoonist.

In alternative exemplary embodiments, the controller 410 may control the moving speed or distance of the cartoon content, such that one or more cuts included in the cartoon content, one or more layers included in the cut, and an effect applied in a layer or cut unit, may be appropriately displayed on the display unit 230.

The controller 410 may be configured to control an effect of a cut included in a display region to be directed within a directing section of the effect. In more detail, the controller 410 may be configured to control the effect to be directed until a directing end location of the effect passes through a reference directing line of the display region from when a directing start location of the effect passes through the reference directing line.

The communication unit 420 may include one or more components that enable communication between the cartoon content display apparatus 400 and the cartoon content server 100. For example, the communication unit 4220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, etc. The mobile communication unit may exchange a radio signal with at least one other component chosen from among a base station, an external terminal, and a server in a mobile communication network. The radio signal may include a voice call signal, a video communication call signal, or various types of data via transmission and reception of text/multimedia messages. The communication unit 420 may communicate with the cartoon content server 100 to obtain the cartoon content or an application for displaying the cartoon content from the cartoon content server 100.

The display unit 430 may display the cartoon content, and may also display the cartoon content by moving the cartoon content in correspondence with the user event with respect to the cartoon content. The display unit 430 may display the cartoon content by moving the cartoon content according to the moving speed and distance in consideration of the user event and the property information of the cartoon content. Meanwhile, when the display unit 230 is configured with a touch screen in which a touch pad forms a layer structure, the display unit 230 may be used as an input device in addition to an output device. The display unit 230 may include at least one of a liquid crystal display (LCD), a thin film transistor-liquid crystal display (TFT-LCD), an organic light-emitting diode (OLED) display, a flexible display, a 3D display, and an electrophoretic display, or other suitable display device.

The input unit 2440 may include any means used by a user to input data for controlling the cartoon content display apparatus 400. For example, the input unit 440 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 440 may obtain a user input. For example, the input unit 440 may obtain a user event with respect to the cartoon content, via a scroll input, a direction key input, a movable touch input having a predetermined direction, or other suitable user input.

The storage unit 450 may store the cartoon content obtained through the communication unit 420.

The sound output unit 460 may output audio data received from the communication unit 420 or stored in a memory. The sound output unit 460 may output sound signals relating to any effect sound and/or any background sound included in the cartoon content. The sound output unit 460 may include a speaker, a buzzer, etc.

The sound output unit 460 may further include a vibration motor (not shown). The vibration motor may output a vibration signal. For example, the vibration motor may output the vibration signal corresponding to an output of audio data or image data (for example, the effect sound and the background sound included in the cartoon content). The vibration motor may also output the vibration signal when a touch is input to the touch screen.

Figure 5:
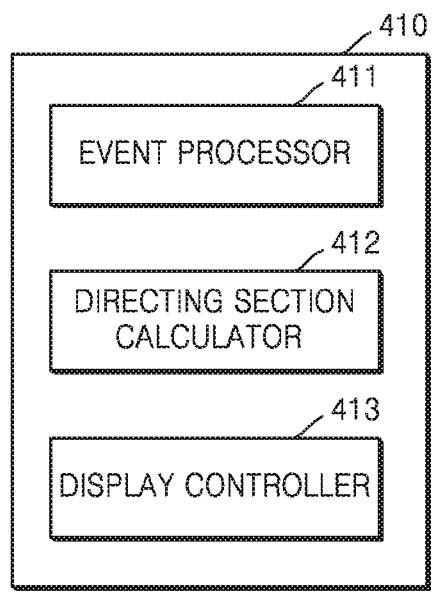
FIG. 5 is a block diagram of the controller of FIG. 4.

FIG. 5 is a block diagram of the controller 410.

Referring to FIG. 5, the controller 410 may include an event processor 411, a directing section calculator 412, and a display controller 413.

The event processor 411 may calculate a moving distance or speed of the cartoon content corresponding to a user event that is input through the input unit 440, or process the user event according to the calculated moving distance of speed. The event processor 411 may calculate a moving speed or distance of a cut included in a display region in correspondence with the user event. The event processor 411 may calculate the moving distance or speed of the cartoon content in correspondence with the user event, and allow the cartoon content to move at the moving speed by the moving distance. The event processor 411 may calculate the moving speed or distance in consideration of input time and direction of the user event, i.e., via a scroll input, a direction key input, and a movable touch input, or other suitable user input.

The directing section calculator 412 may be configured to set a directing section of an effect of a cut included in a display region displayed through the display unit 430 in consideration of a directing start location of the effect and a directing end location, and the directing section calculator may also be configured to reset the directing section in consideration of a reference directing section set based on the directing section and a height of the cut. In this regard, the reference directing section may be a value that is set based on the height of the cut, and may be set, for example, as the same length as the height of the cut.

In more detail, the directing section calculator 412 may be configured to set the directing section between the directing start location and the directing end location that are set with respect to the effect of the cut. The directing section may be preferably set as a certain line in a direction perpendicular to a travel direction of the directing start location and the directing end location.

The directing section calculator 412 may compare a length of the directing section of the effect and a length of the reference directing section that is a value set based on the height of the cut, and, when the length of the directing section of the effect exceeds the length of the reference directing section, the directing section calculator may be configured to reset the length of the directing section of the effect as the length of the reference directing section.

The directing section calculator 412 may compare the length of the directing section of the effect and a length of a preset maximum directing section length, and when the length of the directing section of the effect exceeds the length of the preset maximum directing section length, the directing section calculator may be configured to reset the length of the directing section of the effect as the length of the preset maximum directing section length. In this regard, if the length of the directing section of the effect is reset, the directing section calculator 412 may adjust the directing start location and/or the directing end location of the effect according to the length of the directing section. For example, when the length of the directing section is reduced, the directing start location of the effect may be adjusted to be closer to a start line of the cut or the directing end location of the effect may be adjusted to be closer to an end line of the cut.

The display controller 413 may be configured to control moving of the cartoon content by the moving distance calculated by the event processor 411 and the effect to be directed until the directing end location of the effect passes through a reference directing line of the display region from when the directing start location of the effect passes through the reference directing line.

Figure 6A:
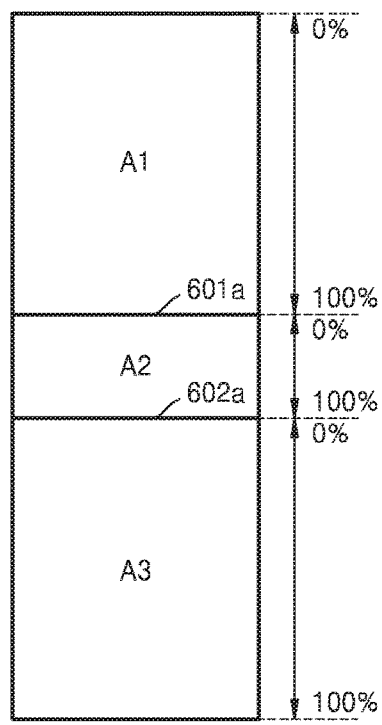
FIGS. 6A and 6B are diagrams for describing a directing section set with respect to an effect.
Figure 6B:
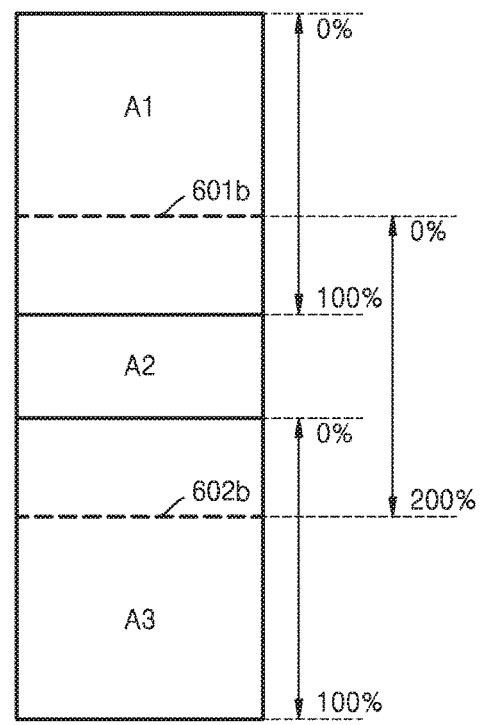

FIGS. 6A and 6B are diagrams for describing a directing section that has been set with respect to an effect.

As shown in FIG. 6A, the cartoon content generation apparatus 200 according to the exemplary embodiments may be configured to set a section having the same length as a height of a cut as the directing section. In contrast, as shown in FIG. 6B, the cartoon content generation apparatus 200 according to the exemplary embodiments may be configured to set a section having a length exceeding the height of the cut as the directing section. In the case of FIG. 6B, a directing start location of an effect included in A2 is denoted as 601*b*, and a directing end location thereof is denoted as 602*b*. That is, the effect included in A2 may be directed until a directing start location 601*b* passes through a directing end location 602*b* from a reference directing line.

Figure 7:
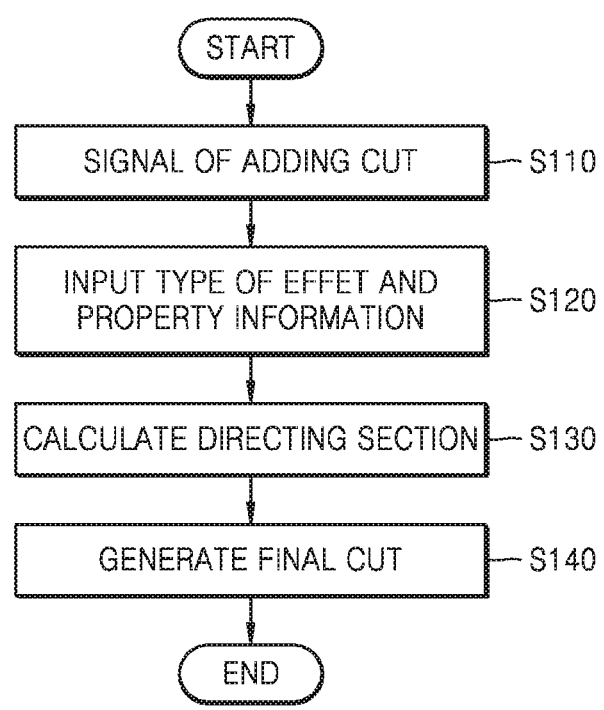
FIG. 7 is a flowchart of a cartoon content generation method according to exemplary embodiments.

FIG. 7 is a flowchart of a cartoon content generation method according to exemplary embodiments.

Referring to FIG. 7, the cartoon content generation method according to the exemplary embodiments may include an operation S110 of inputting a cut adding signal, an operation S120 of inputting the type of effect and property information, an operation S130 of calculating a directing section, and an operation S140 of generating a final cut.

In operation S110, the cartoon content generation apparatus 200 controls one or more cuts that are to be added to generated cartoon content by a user via the user's input (i.e. the user inputs a cut adding signal).

In operation S120, the cartoon content generation apparatus 200 controls the type of the effect and/or the property information of the effect that is/are to be included in the one or more layers included in one cut, as input by the user. In this regard, the property information may include a directing start location and/or a directing end location that is used to define a directing section of the effect.

In operation S130, the cartoon content generation apparatus 200 calculates the directing section of the effect between the directing start location and the directing end location of the effect included in the cut.

In operation S140, the cartoon content generation apparatus 200 generates the final cut by adding the input effect to the cut or the layers. The cartoon content generation apparatus 200 generates the final cut such that the input effect is directed between the directing start location and the directing end location, for example.

Figure 8:
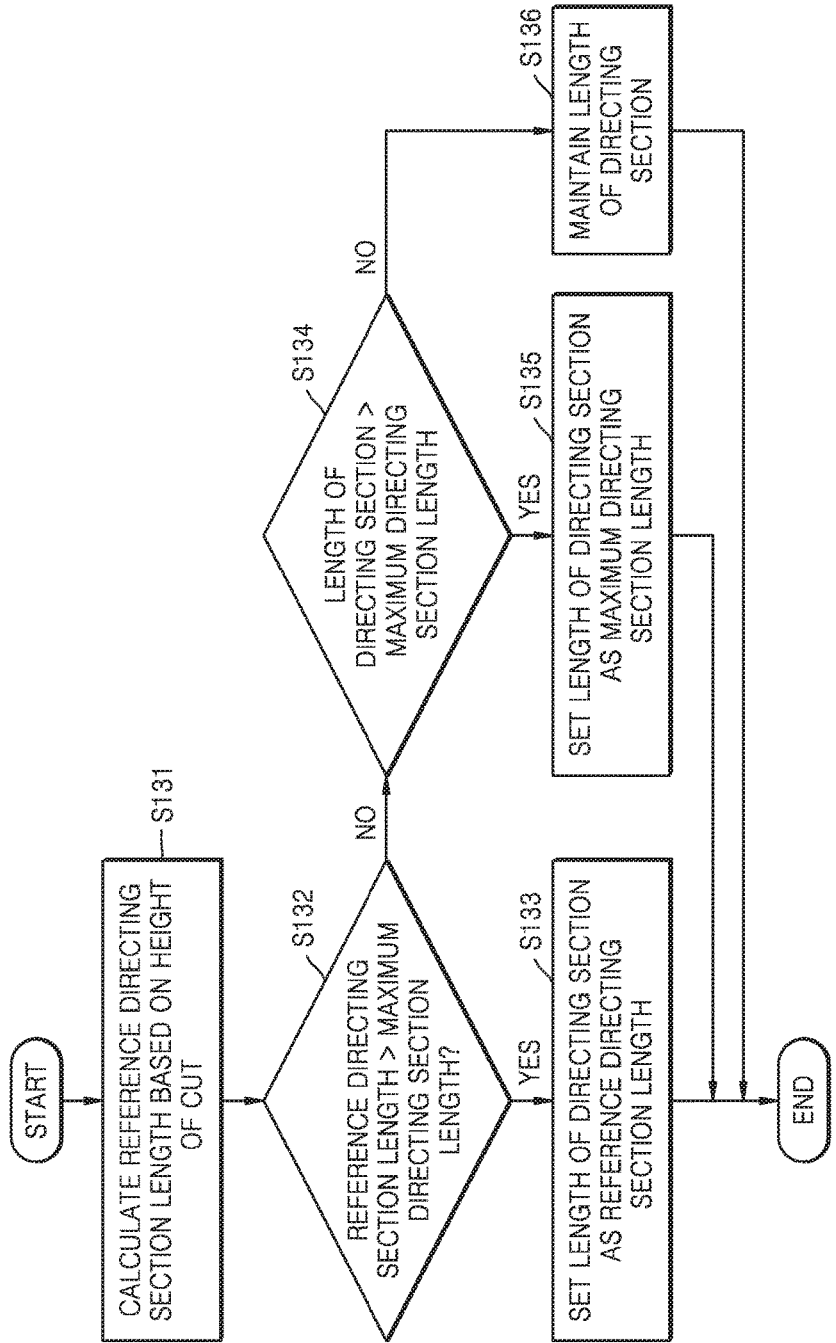
FIG. 8 is a detailed flowchart of an operation of calculating a directing section.

FIG. 8 is a detailed flowchart of the operation S130 of calculating a directing section.

In the operation S130 of calculating the directing section of FIG. 8, the cartoon content generation apparatus 200 is configured to prevent an excessive increase in the directing section of an effect, and, in consideration of a height of a cut and the display unit 430 of the cartoon content display apparatus 400, adjusts the length of the directing section of the effect such that the effect may be appropriately displayed to a user. In this regard, the length of the directing section of the effect is the distance between the directing start location and the directing end location of the directing section. The distance may be the shortest distance in relation to the same direction as the travel direction.

The operation S130 of calculating the directing section may include operations S131 through S136, in certain embodiments. In operation S131, the cartoon content generation apparatus 200 calculates a reference directing section length based on the height of the cut in which the effect is set during calculating the directing section of the effect. The cartoon content generation apparatus 200 calculates the reference directing section length in proportion to the height of the cut.

In operation S132, the cartoon content generation apparatus 200 compares the reference directing section length and a maximum directing section length. In this regard, the maximum directing section length may be a maximum threshold value of the directing section that is preset by a manager.

In operation S133, the cartoon content generation apparatus 200 sets the length of the directing section of the effect as the reference directing section length when the reference directing section length exceeds the maximum directing section length.

In operation S134, the cartoon content generation apparatus 200 compares the length of the directing section of the effect and the maximum directing section length when the reference directing section length does not exceed the maximum directing section length.

In operation S135, the cartoon content generation apparatus 200 sets the length of the directing section of the effect as the maximum directing section length when the reference directing section length exceeds the maximum directing section length.

In operation S136, the cartoon content generation apparatus 200 maintain the length of the directing section of the effect when the reference directing section length does not exceed the maximum directing section length.

Figure 9:
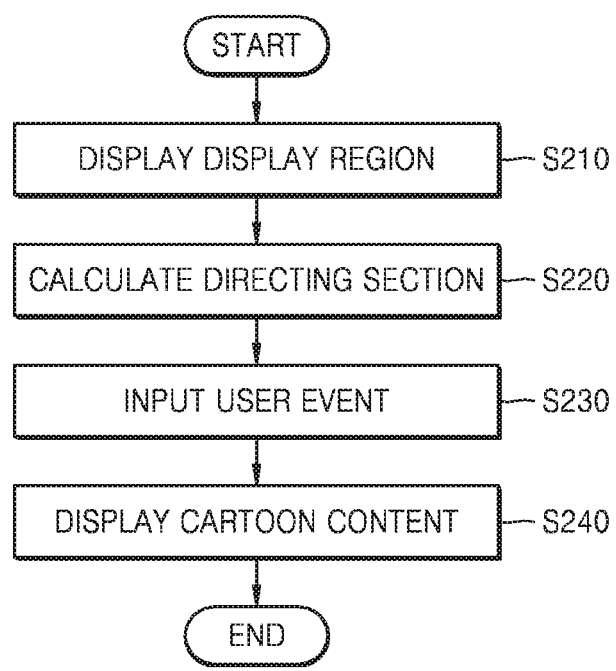
FIG. 9 is a flowchart of a cartoon content display method according to exemplary embodiments.

FIG. 9 is a flowchart of a cartoon content display method according to exemplary embodiments.

Referring to FIG. 9, the cartoon content display method of this embodiment includes an operation S210 of displaying a display region, an operation S220 of calculating a directing section, an operation S230 of inputting a user event, and an operation S240 of displaying cartoon content.

In operation S210, the cartoon content display apparatus 400 displays cartoon content stored therein or cartoon content received from the cartoon content providing server 100. The cartoon content display apparatus 400 displays the display region that is the whole or a part of the cartoon content through the display unit 430. The display region of the cartoon content may be moved in correspondence with the user event.

In operation S220, the cartoon content display apparatus 400 sets the directing section of an effect of a cut included in the display region displayed through the display unit 430 in consideration of a directing start location and/or a directing end location of the effect. The operation S220 will be described in more detail with reference to FIG. 10 below.

In operation S230, the cartoon content display apparatus 400 receives the user event through the input unit 410 and calculates a moving distance or a moving speed of the cartoon content corresponding to the user event.

In operation S240, the cartoon content display apparatus 400 controls the effect to be directed during the directing section while moving the cartoon content by the calculated moving distance.

Figure 10:
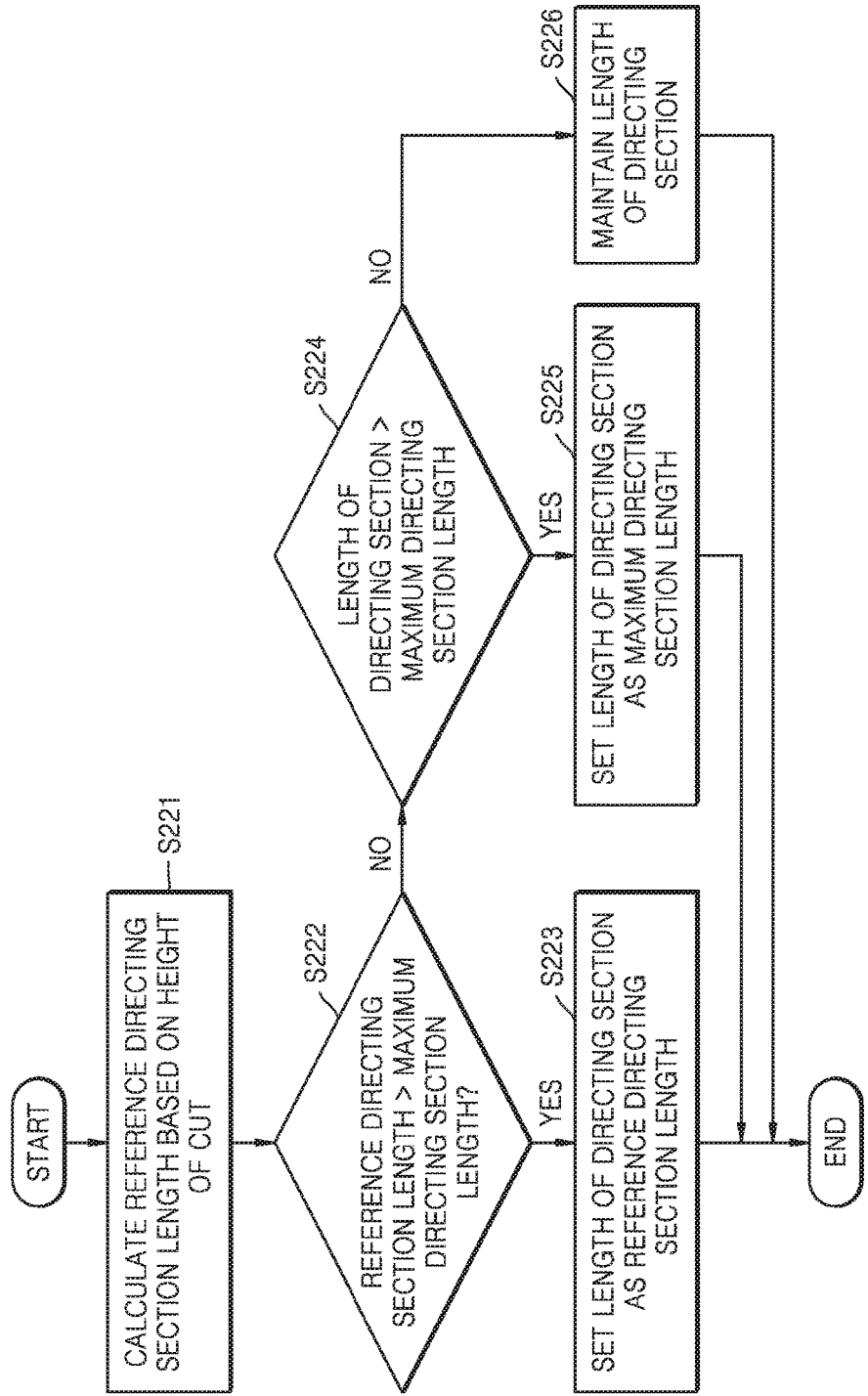
FIG. 10 is a detailed flowchart of an operation of calculating a directing section.

FIG. 10 is a detailed flowchart of an embodiment of the operation S220 of calculating a directing section.

In the operation S220 of calculating the directing section of FIG. 810, the cartoon content display apparatus 400 prevents an excessive increase in the directing section of an effect, and, in consideration of a height of a cut and the display unit 430 of the cartoon content display apparatus 400, readjusts the length of the directing section of the effect such that the effect may be appropriately displayed to a user.

The operation S220 of calculating the directing section includes operations S221 through S226. In operation S221, the cartoon content display apparatus 400 calculates a reference directing section length based on the height of the cut in which the effect is set during calculating the directing section of the effect. The cartoon content display apparatus 400 calculates the reference directing section length in proportion to the height of the cut.

In operation S222, the cartoon content display apparatus 400 compares the reference directing section length and a maximum directing section length. In this regard, the maximum directing section length may be a maximum threshold value of the directing section that is preset by a manager.

In operation S223, the cartoon content display apparatus 400 sets the length of the directing section of the effect as the reference directing section length when the reference directing section length exceeds the maximum directing section length.

In operation S224, the cartoon content display apparatus 400 compares the length of the directing section of the effect and the maximum directing section length when the reference directing section length does not exceed the maximum directing section length.

In operation S225, the cartoon content display apparatus 400 sets the length of the directing section of the effect as the maximum directing section length when the reference directing section length exceeds the maximum directing section length.

In operation S226, the cartoon content display apparatus 400 maintains the length of the directing section of the effect when the reference directing section length does not exceed the maximum directing section length.

As described above, according to the one or more of the above exemplary embodiments, cartoon content may be generated as intended by a cartoon content creator.

Also, cartoon content may be generated by setting a directing section of an effect included in the cartoon content as a designation section of a creator, thereby directing the effect within the directing section.

Also, an effect may be displayed during a time in which a directing section is displayed, as designated by a creator in correspondence with a user event.

The one or more of the above exemplary embodiments may be embodied as a computer program that can be executed in a computer using various components. The computer program may be recorded on a computer-readable recording medium. Examples of the computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in any appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for generating cartoon content, the apparatus comprising:
    a cut input controller configured to control receiving of a signal of adding a first cut comprising one or more layers;
    an effect input controller configured to control receiving of a type of a first effect applied to the one or more layers; and
    a cut generator configured to generate a first final cut such that the one or more layers express the first effect by making the first effect correspond to a user event received from a user,
    wherein the effect input controller controls receiving of a directing start location and a directing end location of the first effect in correspondence with the first effect,
    wherein the cut generator sets a region between the directing start location and the directing end location of the first effect as a first directing section and generates the first final cut such that the first effect is directed in the first directing section,
    wherein the effect is set to be directed from when the directing start location of the effect passes through a reference direction line of a display region while moving the cartoon content, until the directing end location of the effect passes through the reference directing line, and
    wherein the display region is the whole or a part of the cartoon content, that is shown to the user.

2. The apparatus of claim 1,
    wherein the directing end location of the first effect is determined as a lower region in relation to the directing start location of the first effect, and
    wherein the directing start location and the directing end location of the first effect are set as lines perpendicular to a scrolling direction of the cartoon content.

3. The apparatus of claim 1,
    wherein the effect input controller receives a signal of adding a second cut that comprises one or more layers and that is a subsequent cut of the first cut, controls receiving of a second effect applied to the one or more layers included in the second cut, and controls receiving of a directing start location and a directing end location of the second effect,
    wherein the cut generator sets a region between the directing start location and the directing end location of the second effect as a second directing section and generates a second final cut such that the second effect is directed in the second directing section, and
    wherein the second directing section wholly or partially overlaps with the first directing section.

4. The apparatus of claim 1, wherein the first directing section is broadened or narrowed in consideration of at least one of the number of effects of the first cut, a type of the first effect, and a height of the first cut.

5. The apparatus of claim 1, further comprising: a directing section calculator configured to compare a length of the first directing section and a length of a reference directing section set based on a height of the first cut, and, when the length of the first directing section exceeds the length of the reference directing section, the directing section calculator sets the length of the first directing section as the length of the reference directing section.

6. The apparatus of claim 1,
    wherein each of the directing start location and the directing end location is a location in the cut.

7. The apparatus of claim 1, wherein the directing start location and the directing end location are each set as a relative location with respect to height to the cut or an absolute location as a pixel in the cut.

8. A method of generating cartoon content, the method comprising:
    receiving a signal of adding a first cut to be included in the cartoon content and comprising one or more layers, wherein an input unit performs the receiving of the signal;
    receiving a type of a first effect applied to the one or more layers, wherein the input unit performs the receiving of the type of a first effect; and
    generating a first final cut such that the one or more layers express the first effect by making the first effect correspond to a user event received from a user, wherein a controller performs the generating, wherein the receiving of the type of the first effect comprises: receiving a directing start location and a directing end location of the first effect in correspondence with the first effect, wherein the generating of the first final cut comprises: setting a region between the directing start location and the directing end location of the first effect as a first directing section and generating the first final cut such that the first effect is directed in the first directing section, wherein the effect is set to be directed from when the directing start location of the effect passes through a reference directing line of a display region while moving the cartoon content, until the directing end location of the effect passes through the reference directing line, and wherein the display region is the whole or a part of the cartoon content, that is shown to the user.

9. The method of claim 8, wherein each of the directing start location and the directing end location is a location in the cut.

10. The method of claim 8, wherein the directing start location and the directing end location are set as a relative location with respect to height to the cut or an absolute location as a pixel in the cut.

11. An apparatus for displaying cartoon content, the apparatus comprising:

a display unit configured to display a display region that is the whole or a part of the cartoon content;

a directing section calculator configured to set a directing section of an effect included in a cut within a directing section included in the display region in consideration of a directing start location and a directing end location of the effect;

an input unit configured to receive a user event from a user;

an event processor configured to calculate a moving distance corresponding to the user event; and a display controller configured to control the effect to be directed from when the directing start location of the effect passes through a reference directing line of the display region while moving the cartoon content by the calculated moving distance, until the directing end location of the effect passes through the reference directing line.

12. The apparatus of claim 11, wherein the directing section calculator compares the directing section and a reference directing section set based on a height of the cut and resets the directing section.

13. The apparatus of claim 11, wherein each of the directing start location and the directing end location is a location in the cut.

14. The apparatus of claim 11, wherein the directing start location and the directing end location are each set as a relative location with respect to height to the cut or an absolute location as a pixel in the cut.

* * * * *